United States Patent [19]

Guscott et al.

[11] Patent Number: 4,486,661
[45] Date of Patent: Dec. 4, 1984

[54] WALL MOUNTABLE MODULAR SNAP-TOGETHER PASSIVE INFRARED DETECTOR ASSEMBLY

[75] Inventors: John K. Guscott, Lynnfield; Hugh D. Dyer, Norton, both of Mass.

[73] Assignee: American District Telegraph Company, New York, N.Y.

[21] Appl. No.: 390,503

[22] Filed: Jun. 21, 1982

[51] Int. Cl.³ .............................................. G01J 5/04
[52] U.S. Cl. ..................................... 250/342; 250/353
[58] Field of Search ................... 250/342, 353, 358.1, 250/221, 239, 338, 336.1; 340/693; 374/208; 361/394, 393, 390

[56] References Cited

U.S. PATENT DOCUMENTS 4,375,034 2/1983 Guscott ............................. 250/342

FOREIGN PATENT DOCUMENTS 2314567 10/1974 Fed. Rep. of Germany ...... 340/693

Primary Examiner—Janice A. Howell
Assistant Examiner—Constantine Hannaher
Attorney, Agent, or Firm—Weingarten, Schurgin, Gagnebin & Hayes

[57] ABSTRACT

A snap-together, passive infrared detector assembly includes a modular passive infrared detector sub-assembly defining an optical cavity. In one embodiment, the passive infrared detector sub-assembly is slidably mounted to a resilient U-shaped housing sub-assembly suitable for high wall or ceiling flush mounting. (An aesthetic cover plate is snap-locked to the U-shaped housing.) In another embodiment, the passive detector sub-assembly is mounted in a plastic housing having an aperture for high wall or ceiling surface mounting. An optical window is snap-locked onto the mouth of the optical cavity in both embodiments. Both embodiments are self-contained and fashioned substantially of a plastic material. The modular passive infrared detector sub-assembly includes an optics and an electronics module. The optics module is composed of snap-together first and second plastic mirrored members having respective arcuate metalized surfaces which define the optical cavity. The electronics module is comprised of a support member snapped to a cover member. The support and cover members have respective metalized walls which form an electromagnetically protected circuitry enclosure.

28 Claims, 6 Drawing Figures

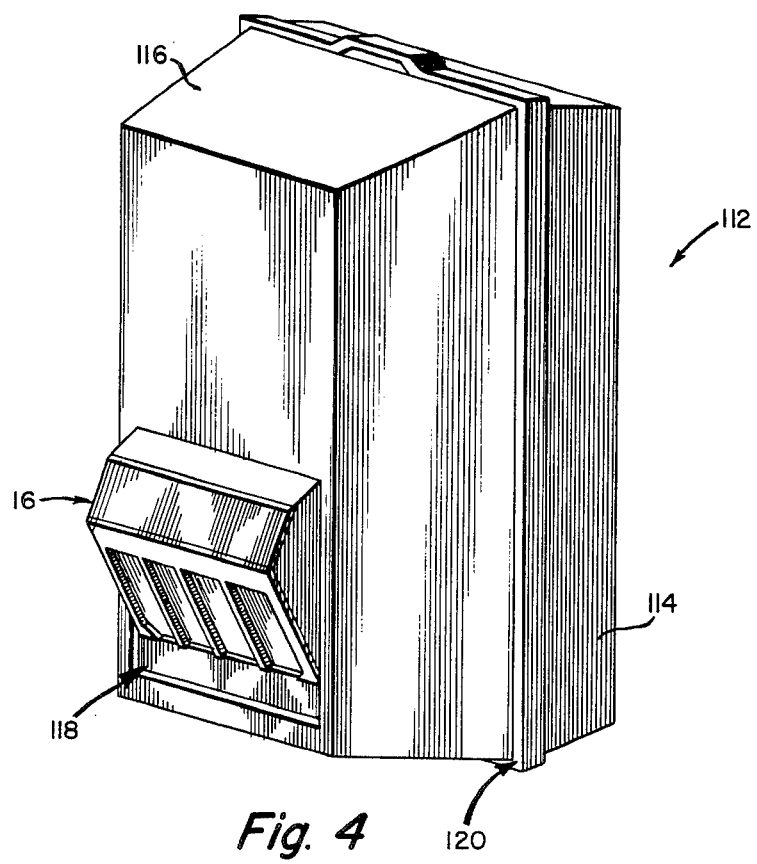
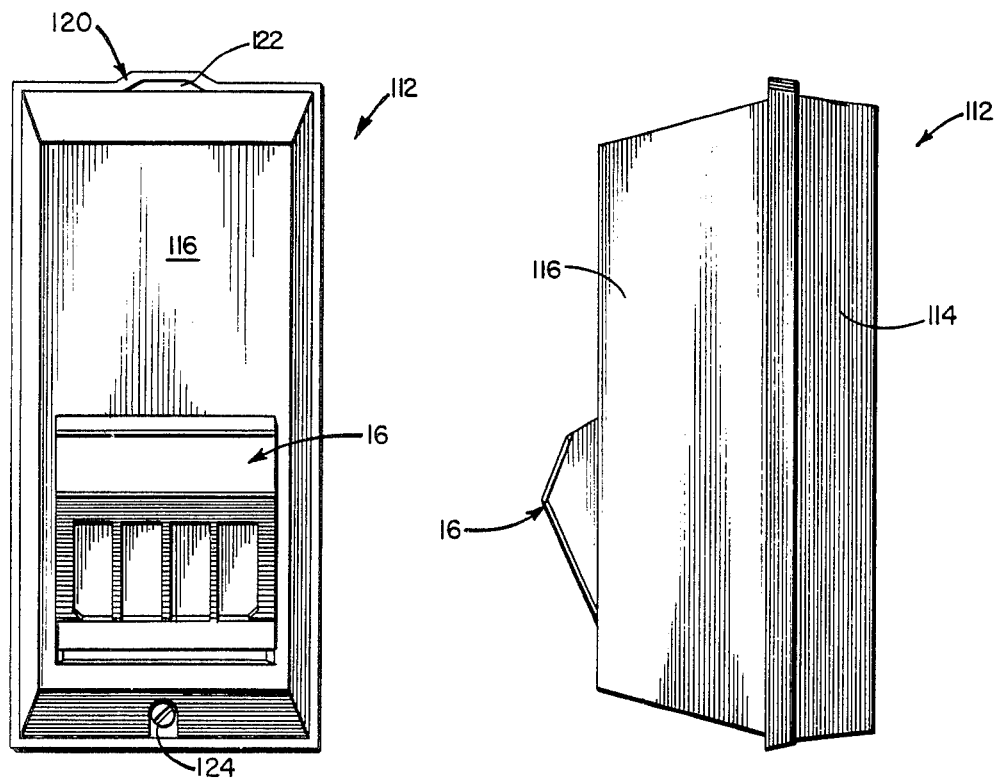
Fig. 4
Fig. 5
Fig. 6

WALL MOUNTABLE MODULAR SNAP-TOGETHER PASSIVE INFRARED DETECTOR ASSEMBLY

FIELD OF THE INVENTION

This invention is drawn to the field of housings for electrical devices, and more particularly, to a novel modular snap-together wall mountable passive infrared detector assembly.

BACKGROUND OF THE INVENTION

Passive infrared detectors are commonly found in homes, commerical offices, manufacturing facilities, and other locations where the security of persons and property may be compromised by an unauthorized person. Such systems are responsive to the presence of infrared energy radiated by the body of the intruder and are operative to provide an alarm indication signaling the detection of the infrared energy. Typically, one or more detector assembly is positioned high about the walls or on the ceiling of the region to be secured against intruders so that the field of view of each of the instruments monitors a region for the presence of infrared energy in unauthorized places and at unauthorized times.

SUMMARY OF THE INVENTION

The present invention provides a wall mountable modular passive infrared detector assembly. The novel detector assembly of the present invention is composed of cooperating snap-together plastic modules each of which is of a substantially unitary construction for ease of manufacture. The snap-locked modules are easily assembled upon initial installation and may quickly be replaceably interchanged. The passive infrared detector assembly of the present invention is self-contained, relatively maintenance-free, and presents an aesthetically pleasant and unobtrusive when wall or ceiling mounted.

One embodiment of a modular snap-together passive infrared detector assembly of the invention which is suitable for high wall or ceiling flush mounting includes a passive infrared sub-assembly defining an optical cavity; a resilient U-shaped housing sub-assembly adpated for holding the passive infrared detector and for mounting the detector into a support wall; an optical window sub-assembly adapted to be snap-locked to the passive infrared detector sub-assembly for forming an environmentally protected optical enclosure; and a cover plate adapted to be snap-locked to the resilient U-shaped housing sub-assembly which provides an aesthetically attractive appearance.

Another embodiment of a modular snap-together passive infrared detector assembly of the invention which is suitable for high wall or ceiling surface mounting includes a two-piece housing defining an enclosure. One member of the housing is a base adapted to be surface mounted to a wall, and the other member of the housing is a cover having an aperture. A modular passive infrared detector sub-assembly defining an optical cavity is mounted in the enclosure formed by the two-piece housing. An optical window sub-assembly is adapted to be snap-locked to the optical cavity to form an environmentally protected enclosure. When assembled, the optical window extends through the aperture provided in the housing cover member.

According to one aspect of the preferred embodiments, the passive infrared detector sub-assembly of the invention includes an optical module and an electronics module removably fastened to the optical module. The optical module of the passive infrared detector sub-assembly includes first and second plastic mirrored members having respective metallized plastic arcuate reflecting surfaces which define the optical cavity. The first and second plastic mirrored members of the optical module are slidably mounted and snap-locked together. The electronicmodule of the passive infrared detector sub-assembly includes a first plastic member for supporting the detector electronics, and a second plastic cover member removably attached to the electronics support module. preferably, threaded fasteners are used to removably fasten the electronics and optical modules together.

According to another aspect of the preferred embodiments, the optical window sub-assembly of the present invention snap-locks onto the optical module of the passive infrared detector sub-assembly. For this purpose, one of the plastic mirrored members of the optical module has a flange which cooperates with a U-shaped flange formed on the optical window sub-assembly to provide a hinge. The other plastic mirrored member of the optical module of the passive infrared detector sub-assembly has a flange having a recess which cooperates with a flange having a finger provided on the other end of the optical window. The application of pressure to the end of the optical window remote from the hinge snap-locks the fingered flange into the recessed flange. The optical window sub-assembly is provided with a plurality of apertures which are covered by an infrared transparent material. When snapped into place, the optical window sub-assembly seals the optical cavity and prevents dirt, dust and other contaminants from deteriorating the optical quality of the cavity without interfering with the reception of infrared energy.

DESCRIPTION OF THE DRAWINGS

The invention will be more fully understood from the following detailed description taken in conjunction with the accompanying drawings in which:

FIG. 4 is an isometric view of a second embodiment of a passive infrared detector assembly of the present invention;

FIG. 5 is a front view of the embodiment of FIG. 4; and

FIG. 6 is a side view of the embodiment of FIG. 4.

DESCRIPTION OF THE PREFERRED EMBODIMENT

Figure 1:
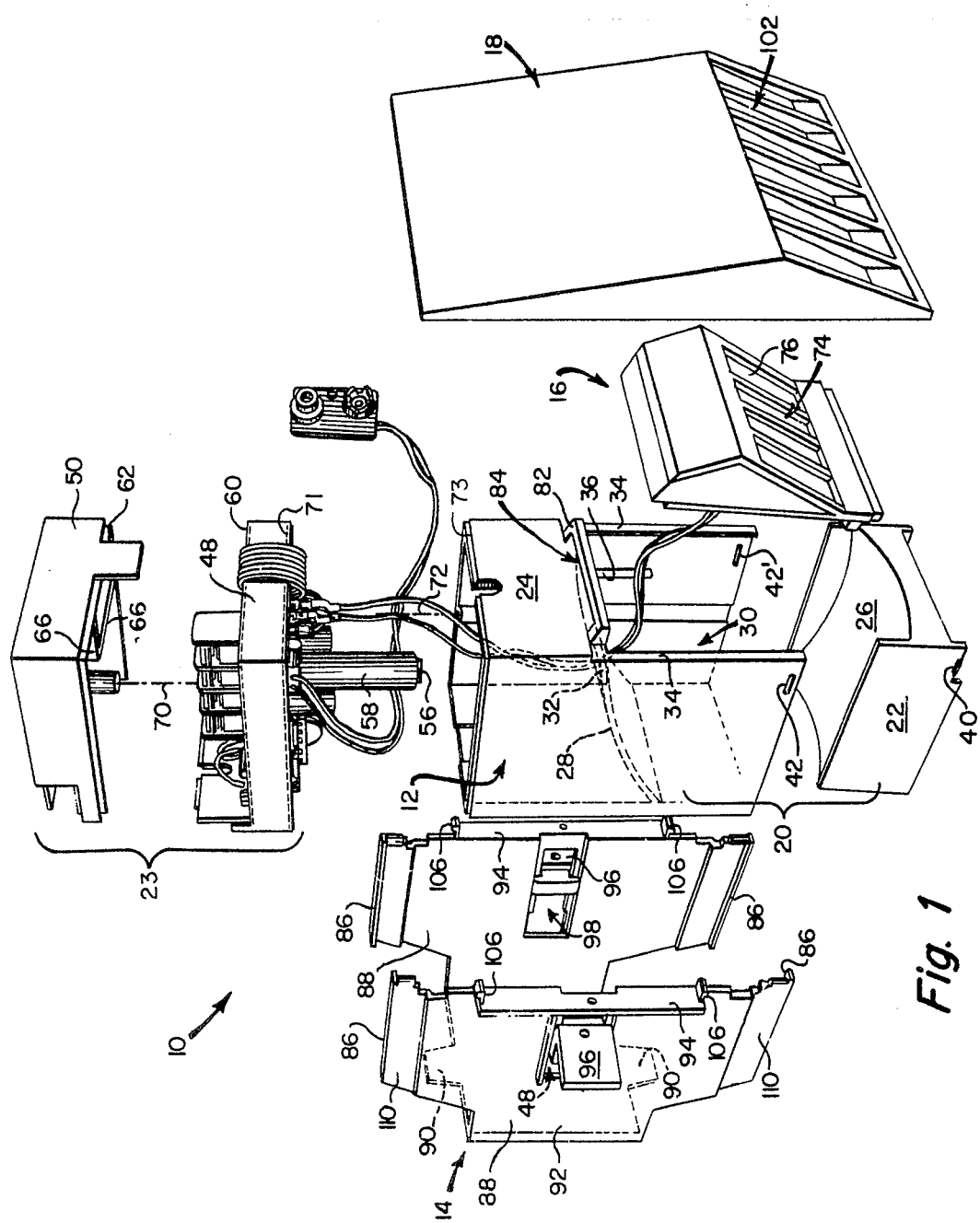
FIG. 1 is an exploded perspective view of one embodiment of a passive infrared detector assembly of the present invention.

Referring now to FIG. 1, generally designated at 10 is a exploded perspective view of one embodiment of a novel modular snap-together wall mountable passive infrared detector assembly of the invention suitable for high wall or ceiling flush mounting. The assembly 10 includes a passive infrared detector sub-assembly generally designated at 12 slidably mounted to a U-shaped resilient housing sub-assembly generally designated at 14. An optical window generally designated at 16 is snap-locked to the sub-assembly 12, and an aesthetically-designed cover plate sub-assembly generally designated at 18 is snap-locked to the sub-assembly 14. Each of the components of the modules 12, 14, 16, and 18 is of a substantially unitary construction and fashioned out of a suitable plastic material by techniques well-known to those skilled in the art.

The passive infrared detector sub-assembly 12 is a modular, snap-together, and self-contaned unit which is composed of an optical module 20 and an electronics module 23.

The optical module 20 of the sub-assembly 12 is composed of a first and a second plastic mirrored member 22 and 24 each having respective metallized arcuate reflecting surfaces 26 and 28 which together define an optical cavity 30. The surface 28 is provided with an aperture 32. Preferably, the metallized surface 26 is either concave spherical or parabolic and the metallized surface 28 is concave cylindrical. Reference is this connection may be had to commonly assigned copending application Ser. No.173,124, now U.S. Pat. No. 4,375,034, incorporated herein by reference, for a description and explanation of the operation of a preferred optical cavity of the optical module 20 of the passive infrared detector sub-assembly 12 of the present invention.

Figure 2:
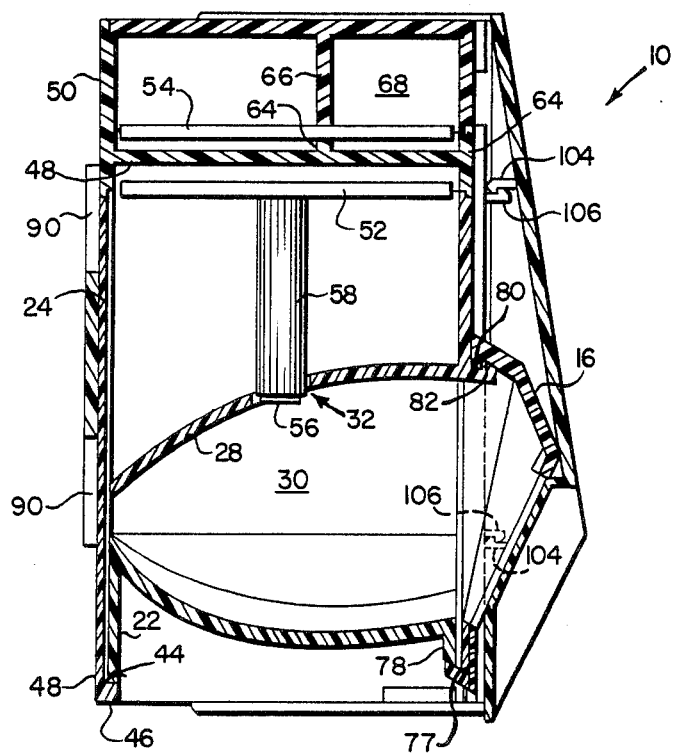
FIG. 2 is a sectional view of the passive infrared detector assembly of FIG. 1.

The plastic mirrored member 22 is slidably mounted to the plastic mirrored member 24 and properly aligned by the cooperation of inwardly and laterally directed flanges 34 formed on the forward edge of the plastic mirrored member 2 4 and a plurality of support ribs 36, one of which is shown, which are formed on the inside faces of the side walls of the plastic mirrored member 24. An outwardly and laterally directed tongue 40 formed on the plastic mirrored member 22 is removably snap-locked to a groove 42 formed in the plastic mirrored member 24. Another outwardly and laterally directed tongue, not shown, is formed on the member 22 and is adapted to snap-lock the groove 42'. As can be seen by referring to FIG. 2, the bottom edge of the rear wall of the plastic mirrored member 22 has a recess 44 which adapted to removably snap-lock an inwardly and forwardly directed flange 46 carried by a resilient arm 48 formed on the rear wall of the plastic mirrored member 24.

The electronics module 23 of the passive infrared detector sub-assembly 12 of the invention is composed of a plastic support member 48 and a plastic protective cover member 50. As can be seen by referring to FIG. 2, the plastic support member 48 preferably has printed circuit (PC) boards 52 and 54 mounted on both sides thereof. A passive infrared detector 56 is supported on and electrically connected to the PC board 52 by a neck 58 and just extends throught the aperture 32 of the plastic mirrored member 24. The detector 56 and associated electronics are responsive to the presence of infrared energy in the optical cavity 30 of the optical module 20 and are operative to provide an alarm indication signaling the detection of a possible intruder. Reference in this connection may be had to the above identified and incorporated commonly assigned patent application for a description and explanation of the operation of a preferred electronic circuitry of the electronics module 23 of the passive infrared detector sub-assembly of the present invention.

Mating and complementary flanged shoulders 60 and 62 are respectively provided around the perimeter of the members 48 and 50 of the electronics module 23 which are adapted to removably snap together. As can be seen by referring to FIG. 2, metalized walls 64 and 66 are respectively formed on members 48 and 50 transverse to the plane of the members 48 and 50 and are adapted to form a protective enclosure 68 which provides an electromagnetically shielded enclosure. The cover member 50 is removably fastened to the support member 48 preferably by threaded fasteners schematically illustrated at 70. The assembled electronics module 23 is snapped to the optical module 20 by the cooperation between mating and complementary shoulders 71 and 73 and removably fastened to the optical module 20 preferably by threaded fasteners schematically illustrated at 72. A layer of metalization is flash-coated on the surfaces 26 and 28, on the members 48 and 50, and on walls 64 and 66.

Figure 3:
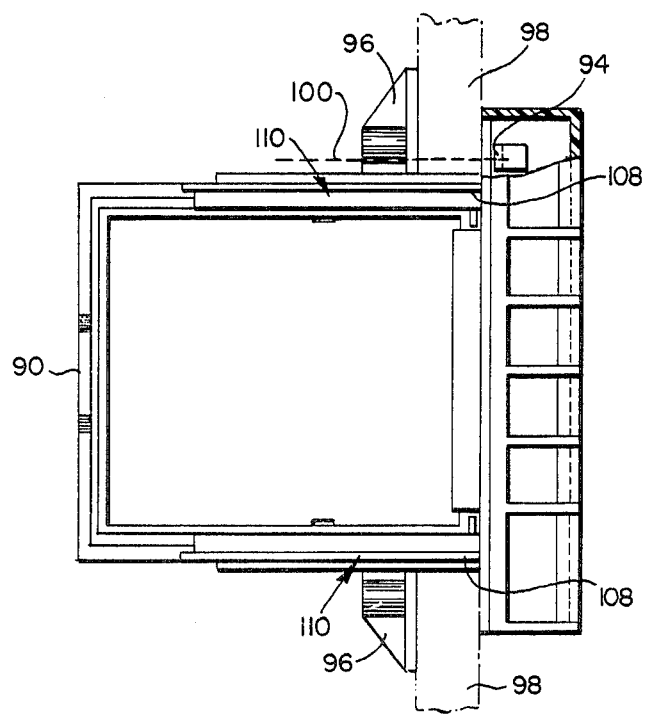
FIG. 3 is a plan view of the passive infrared detector assembly of FIG. 1.

The optical window sub-assembly 16 has a plurality of apertures 74. A suitable window material 76 which is transparent to infrared radiation is positioned in the apertures 74. The optical window sub-assembly 16 is adapted to be removably snap-locked to the mouth of the optical cavity 30 of the optical module 20 of the passive infrared detector sub-assembly 12 for sealing the cavity against contamination by dirt, dust, and other substances which might impare the operation of the detector 12. As can be seen by referring to FIGS. 1, 2, and 3, the window 16 is preferably hinged at one end to the plastic mirrored member 22 by a generally U-shaped flange 77 and a flange 78 respectively formed on the window assembly 16 and plastic rod member 22. The optical window sub-assembly 16 is removably snap-locked onto the optical module 20 by a fingered flange 80 formed on the end of the window 16 remote from the hinge being adapted to engage a cooperating flange 82 having a recess 84 formed on the plastic mirrored member 24.

The U-shaped resilient housing sub-assembly 14 has inwardly and laterally directed flanges 86 formed on the top, and front, and the bottom edges of the legs 88, and has vertically directed and inwardly inclined resilient arms 90 formed on the bottom 92 of the U-shaped resilient housing 14. The passive infrared detector sub-assembly 12 is adapted to be slidably mounted to the U-shaped resilient housing sub-assembly 14 and is securely held in place by the cooperation between the flanges 86, the legs 88, and the resilient bias provided by the arms 90.

A first pair of laterally and outwardly extending apertured ears 94 are formed on the front edge of the legs 88, and a second pair of laterally and outwardly extending apertured ears 96 are adapted to be slidably mounted in respective apertures 98 formed in the legs 88. As can be seen by referring to FIG. 3, the first and the second pair of ears 94 and 96 are adapted to straddle mount a wall 98 of variable thickness; threaded fasteners, schematically illustrated at 100, preferably are used to securely fasten the housing to the wall.

The asethetically-designed cover plate 18 is provided with apertures 102 to permit the passage therethrough of infrared energy. As can be seen from FIGS. 1 and 2, the cover plate 18 is removably snap-locked to the U-shaped housing sub-assembly 14 by the cooperation between mating, complimentary, and interlocking rearwardly directed fingers 104 and forwardly directed fingers 106 respectively formed on the inside face of the cover plate 18 and on the first pair of laterally extending ears 94 of the U-shaped housing sub-assembly 14. As can be seen by referring to FIGS. 1 and 3, the aesthetically-designed cover plate 18 has a plurality of inwardly directed guide rails 108 which are adapted to abut a like plurality of guide recesses 110 formed on the outside face of the legs 88 for ensuring proper alignment of the cover plate 18 and for holding the legs 88 against lateral spreading.

FIGS. 4, 5, and 6 show a perspective, a front, and a side view, respectively, of a second embodiment of the novel modular wall mountable passive infrared detector assembly of the present invention. The embodiment of FIG. 4 is the same as the embodiment of FIG. 1 except that it features the use of a two-piece housig sub-assembly generally designated at 112 instead of the resilient U-shaped housing sub-assembly 14 and the aesthetically designed cover plate 18 of FIG. 1. The embodiment of FIG. 4 is suitable for use in high wall or ceiling surface mounting.

The two-piece housing 112 includes a plastic base member 114 adapted to be securely mounted to the surface of a support wall which may be a high wall or ceiling wall. A plastic cover member 116 having an aperture 118 dimensioned to the outside dimensions of the optical window sub-assembly 16 is cooperative with the base member 116 to form an enclosure into which the passive infrared detector sub-assembly 12 of FIG. 1 is mounted.

The rearward extremity of the perimeter of the cover member 116 is adapted to snap into a shoulder 120 formed on the forward extremity of the plastic base member 114. As shown in FIG. 5, a laterally extending tongue 122 is formed on the cover member 116 which adapted to be inserted into a mating groove formed into the shoulder 120 of the base member 114. A threaded fastener 124 is provided through an aperture formed on the end of the housing remote from the tongue and groove to securely fasten the two-piece housing together.

Each of the components, modules, and sub-assemblies of the modular snap-together, wall mountable, passive infrared detector assembly of the invention is of substantially unitary construction and readily manufactured by well-known plastic molding and processing techniques. The components, modules, and sub-assemblies may be easily assembled together for installation and disassembled for trouble-shooting and other purposes. The electronics module is assembled by fastening PC boards 52 and 54 to the plastic support board 48, and the plastic cover plate 50 is snapped, and securely fastened, to the support board 48. The plastic mirrored member 22 is slidably mounted and snap-locked to the plastic mirrored member 24, and the optical module 20 is assembled. The optical module 20 is then securely fastened to the electronics module 23 and the passive infrared detector sub-assembly 12 is assembled. The optical window 16 may then be snap-locked to the detector 12. In the flush-mounted embodiment of the present invention, an aperture is formed in the support wall 100 proportioned to receive the U-shaped resilient housing sub-assembly 14. The resilient legs 88 of the housing 14 are bent toward each other and the U-shaped housing is inserted into the apertured wall and securely fastened thereto. The passive infrared detector sub-assembly 12 is then slidably mounted into the housing sub-assembly 14 and the cover plate 18 is snap-locked into place. In the surface mounted embodiment of the invention, the base member 112 is securely fastened to the surface of a support wall. The assembled passive fastened detector sub-assembly is then mounted to the base member and the plastic cover member is snapped to the base member so that the optical window sub-assembly extends through the aperture 118. The fastener 124 is then threaded through the plastic cover to the base member to securely hold the assembly in place. It will be apparent that the process is reversed whenever the embodiments must be attended.

It is to be understood that many modifications of the presently disclosed invention are possible within the scope of the appended claims.

What is claimed is:

1. A modular passive infrared (IR) detector assembly suitable for high wall or ceiling flush mounting comprising, in combination:
    a passive infrared detector sub-assembly defining an optical cavity having a mouth;
    a U-shaped resilient housing sub-assembly for holding said passive infrared detector sub-assembly defining said optical cavity having said mouth and for flushly mounting said passive infrared detector sub-assembly to a wall;
    an infrared window sub-assembly adapted to be removably snapped onto the mouth of said optical cavity of said passive infrared detector sub-assembly for forming an optical enclosure; and
    a cover plate sub-assembly adapted to be removably snapped onto said U-shaped resilient housing sub-assembly over said infrared window sub-assembly;
    said cover plate sub-assembly including an aperture through which IR energy can pass to said cavity.

2. A modular wall mountable passive infrared detector assembly, as recited in claim 1, wherein said passive infrared detector sub-assembly defining an optical cavity includes an optical module and an electronics module.

3. A modular wall mountable passive infrared detector assembly, as recited in claim 2, wherein said optical module includes first and second snap-together plastic mirrored members having respective metalized plastic reflecting surfaces which define said optical cavity.

4. A modular wall mountable passive infrared detector assembly, as recited in claim 3, wherein said first and said second plastic mirrored members are adapted to be slidably mounted.

5. A modular wall mountable passive infrared detector assembly, as recited in claim 4, wherein one of said plastic mirrored members has a tongue and the other plastic mirrored member has a groove cooperative to snap-lock said members together when slidably mounted.

6. A modular wall mountable passive infrared detector assembly, as recited in claim 4, wherein one of said plastic mirrored members has a finger carried by a resilient arm and the other one of said plastic mirrored members has a recess cooperative with said resilient fingered arm to snap-lock said members together.

7. A modular wall mountable passive infrared detector assembly, as recited in claim 2, wherein said electronics module includes a first plastic support member for mouting electronic components and a second plastic cover member removably attached to said first plastic support member, the perimeter of the edges of said support and said cover members having mating and complementary shoulders adapted to snap together.

8. A modular wall mountable passive infrared detector assembly, as recited in claim 1, wherein said U-shaped resilient housing sub-assembly is made of plastic, wherein the U-shaped resilient housing sub-assembly includes spaced confronting leg portions and an innerconnecting web portion, each of said leg portions having top, front, and bottom peripheral edges, and the top, front, and bottom edges of each of the legs of said U-shaped housing sub-assembly are provided with inwardly and laterally directed flanges, and the web of said U-shaped housing sub-assembly is provided with inwardly inclined resilient arms, said flanges and said arms adapted to hold said passive infrared detector sub-assembly.

9. A modular wall mountable passive infrared detector assembly, as recited in claim 8, wherein each of said legs is provided with an aperture, further including a first outwardly and laterally extending ear having a hole slidably mounted in each of said apertures, and a second outwardly and laterally extending ear flange having a hole and formed adjacent the front edge of each said legs, said first ears and said second ear flanges are adapted for straddle mounting a wall.

10. A modular wall mountable passive infrared detector assembly, as recited in claim 3, wherein one of said snap-together plastic mirrored members having a metalized plastic reflecting surface further includes a flange, and the other one of said snap-together plastic mirrored members further includes a flange having a recess; and wherein said optical window has on one end thereof a U-shaped flange adapted to engage said flange to provide a hinge, and on the other end thereof has a finger adapted to engage said recess of said recessed flange to said snap-lock, said optical window sub-assembly to said passive infrared detector sub-assembly.

11. A modular wall mountable passive infrared detector assembly, as recited in claim 9, wherein said cover plate includes a plurality of rearwardly extending fingers, and wherein said second outwardly and laterally extending ears of said U-shaped resilient member further include a like plurality of forwardly extending, mating complementary fingers adapted to snap-lock said plurality of fingers formed on said cover plate.

12. A modular wall mountable passive infrared detector assembly, as recited in claim 11, wherein the legs of said U-shaped resilient housing sub-assembly further includes a plurality of grooves, and said cover plate further includes a like plurality of rearwardly extending rails, said plurality of rails adapted to abut said plurality of grooves to align said cover plate sub-assembly about said U-shaped sub-assembly and prevent lateral spreading of said legs.

13. A modular passive infrared detector assembly suitable for high wall or ceiling surface mounting, comprising in combination:
 a passive infrared detector sub-assembly defining an optical cavity having a mouth;
 a two-piece housing sub-assembly defining an enclosure having an aperture for holding said passive infrared detector sub-assembly and for surface mounting said passive infrared detector sub-assembly to a wall; and
 an infrared window member sub-assembly adpated to be snap-locked onto the mouth of said cavity of said passive infrared detector sub-assembly for forming an environmentally protected optical enclosure.

14. A modular wall mountable passive infrared detector assembly, as recited in claim 13, wherein said passive infrared detector sub-assembly defining an optical cavity includes an optical module and an electronics module.

15. A modular wall mountable passive infrared detector assembly, as recited in claim 14, wherein said optical module includes first and second snap-together plastic mirrored members having respective metalized plastic reflecting surfaces which define said optical cavity.

16. A modular wall mountable passive infrared detector assembly, as recited in claim 15, wherein said first and said second plastic mirrored members are adapted to be slidably mounted.

17. A modular wall mountable passive infrared assembly, as recited in claim 16, wherein one of said plastic mirrored members has a tongue and the other plastic mirrored member has a groove cooperative to snap-lock said members together when slidably mounted.

18. A modular wall mountable passive infrared assembly, as recited in claim 16, wherein one of said plastic mirrored members has a finger carried by a resilient arm and the other one of said plastic mirrored members has a recess cooperative with said resilient fingered arm to snap-lock members together.

19. A modular wall mountable passive infrared detector assembly, as recited in claim 14, wherein said electronics module includes a first plastic support member for mounting electronic components and a second plastic cover member removably attached to said first plastic support member, the perimeter of the edges of said support and said cover members having mating and complementary shoulders adapted to snap together.

20. A modular passive infrared detector assembly suitable for high wall or ceiling surface mounting, as recited in claim 13, wherein said two-piece housing defining an enclosure includes a plastic base member adapted to be mounted to the surface of a support wall, and a plastic cover member having an aperture adapted to be snapped to said base member.

21. A modular passive infrared detector assembly suitable for high wall or ceiling surface mounting, as recited in claim 20 wherein said base member includes on the forward extremity of the perimeter thereof a shoulder adapted to mate with the rearward extremity of the perimeter of said cover member, and further includes a tongue formed on an end of said cover member adapted to engage a complementary groove formed in said shoulder.

22. A modular wall mountable passive infrared detector assembly, as recited in claim 15, wherein one of said snap-together plastic mirrored members having a metalized plastic reflecting surface further includes a flange, and the other one of said snap-together plastic mirrored members further includes a flange having a recess; and wherein said optical window has on one end thereof a U-shaped flange adapted to engage said flange to provide a hinge, and on the other end thereof has a finger adapted to engage said recess of said recessed flange to snap-lock said optical window sub-assembly to said passive infrared detector sub-assembly.

23. A modular snap-together passive infrared detector assembly comprising in combination;
 a modular, snap-together passive infrared detector sub-assembly defining an optical cavity having a mouth;
 an optical window sub-assembly adapted to be snap-locked to the mouth of said passive infrared detector assembly for forming an environmentally protected enclosure; and
 means for mounting said passive infrared detector sub-assembly to a support wall.

24. A modular snap-together passive infrared detector assembly, as recited in claim 23, wherein said passive infrared detector sub-assembly includes cooperative first and second metalized snap-together plastic mirrored members having respective reflecting surfaces defining said optical cavity, and an electronics module adapted to be fastened to said first and second plastic mirrored members.

25. A modular snap-together passive infrared detector assembly, as recited in claim 23, wherein said mounting means includes a U-shaped resilient housing sub-assembly adapted for slidably mounting with said passive infrared detector sub-assembly and for flush mounting a support wall.

26. A modular snap-together passive infrared detector assembly, as recited in claim 25, further including a cover plate having an aperture to be snap-locked to said resilient U-shaped housing.

27. A modular snap-together passive infrared detector assembly, as recited in claim 23, wherein said mounting means includes a two-piece housing adapted for holding said passive infrared detector assembly and for surface mounting to a wall.

28. A modular snap-together passive infrared detector assembly, as recited in claim 27, wherein said two-piece housing includes a plastic base member having a shoulder adapted to snap a cover member having an aperture through which said optical window extends.

* * * * *